United States Patent
Carlson (10) Patent No.: US 12,364,369 B2
(45) Date of Patent: Jul. 22, 2025

(54) POWER SYSTEMS FOR TOUCH-FREE DISPENSERS

(71) Applicant: GOJO Industries, Inc., Akron, OH (US)

(72) Inventor: Grant B. Carlson, Hammonds Port, NY (US)

(73) Assignee: GOJO Industries, Inc., Akron, OH (US)

( * ) Notice: Subject to any disclaimer, the term of this patent is extended or adjusted under 35 U.S.C. 154(b) by 184 days.

(21) Appl. No.: 17/961,638

(22) Filed: Oct. 7, 2022

(65) Prior Publication Data

US 2023/0111480 A1     Apr. 13, 2023

Related U.S. Application Data

(60) Provisional application No. 63/254,191, filed on Oct. 11, 2021.

(51) Int. Cl.
| | | |
|---|---|---|
| *A47K 5/12* | (2006.01) | |
| *H02J 7/00* | (2006.01) | |
| *H02M 3/04* | (2006.01) | |
| *H02M 1/00* | (2006.01) | |
| *H02M 3/155* | (2006.01) | |

(52) U.S. Cl.
CPC ......... *A47K 5/1217* (2013.01); *A47K 5/1202* (2013.01); *H02J 7/007* (2013.01); *H02J 2207/50* (2020.01); *H02M 1/0032* (2021.05); *H02M 1/0048* (2021.05); *H02M 3/04* (2013.01); *H02M 3/155* (2013.01)

(58) Field of Classification Search
CPC ..... A47K 5/1217; A47K 5/1202; H02J 7/007; H02J 2207/50; H02M 3/04; H02M 1/0032; H02M 1/0048; H02M 3/155
See application file for complete search history.

(56) References Cited

U.S. PATENT DOCUMENTS

| | | |
|---|---|---|
| 8,544,693 B2 | 10/2013 | Padain et al. |
| 8,960,498 B2 | 2/2015 | Wegelin et al. |
| 9,172,266 B2 * | 10/2015 | Curtis ..................... H02M 3/02 |
| 9,877,617 B2 | 1/2018 | Bullock et al. |
| 10,238,242 B2 * | 3/2019 | Macleod ............. B05B 11/1009 |
| 11,596,271 B2 * | 3/2023 | McNulty .................. A47K 5/12 |
| 12,009,689 B2 * | 6/2024 | Wegelin .............. H02J 7/00714 |

(Continued)

*Primary Examiner* — Frederick C Nicolas
(74) *Attorney, Agent, or Firm* — Calfee, Halter & Griswold LLP (57) ABSTRACT

Dispensers and dispensers having refill units with energy on the refill unit energy sources are disclosed herein. An exemplary dispenser includes a housing, a motor for operating a pump, an object sensor, an auxiliary power source, a receptacle for receiving a refill unit and an energy on the refill receiving receptacle. The dispenser further includes a processor, memory, one or more capacitors, an energy on refill voltage boost circuit, a high power voltage buck circuit and a low power regulator circuit. The low power regulator circuit provides power for at least the processor and the object sensor. The capacitors provide power to the high power voltage buck circuit and the low voltage regulator, and the high voltage buck circuit provides power to operate the motor. A refill unit have an energy on the refill energy source may be inserted into the dispenser.

19 Claims, 4 Drawing Sheets

(56) References Cited

U.S. PATENT DOCUMENTS

| | | | |
|---|---|---|---|
| 2014/0054322 A1* | 2/2014 | McNulty | B05B 11/1087 |
| | | | 222/190 |
| 2017/0049276 A1* | 2/2017 | Lightner | B05B 11/0054 |
| 2021/0099004 A1 | 4/2021 | Wegelin et al. | |
| 2021/0378458 A1 | 12/2021 | McNulty et al. | |

* cited by examiner

POWER SYSTEMS FOR TOUCH-FREE DISPENSERS

RELATED APPLICATION(S)

This application claims priority to, and the benefits of, U.S. Provisional Patent Application Ser. No. 63/254,191, filed on Oct. 11, 2021 and titled POWER SYSTEMS FOR TOUCH-FREE DISPENSERS, which is incorporated herein by reference in its entirety.

TECHNICAL FIELD

The present invention relates generally to touch-free dispensers and more particularly to power conserving touch-free dispensers that may be used in high-use environments and in low-use environments.

BACKGROUND OF THE INVENTION

Many touch free dispensers are powered by a plurality of batteries, such as "D" or "C" size single cell batteries in a series configuration. Touch-free dispensers continually consume power. They consume power when they are used and they consume power when they are idle, waiting to be used. These touch-free dispensers require a maintenance worker to periodically open up the dispenser and replace the batteries. In an effort to eliminate the need for battery replacement, some leading edge touch-free dispensers are being powered by a dual battery hybrid system that includes both a permanent battery mounted in the touch-free dispenser that is designed to last the life of the dispenser and an additional smaller battery attached to the refill unit or bottle. The battery on the refill unit is often designed to provide power to the dispenser for the sufficient to dispense all of the contents of the bottle. Touch-free dispensers with these dual battery hybrid systems function fairly well in normal use environments as the battery on the refill unit is not depleted before the bottle is empty. However, in other situations, such as, for example, low-use environments, (where the touch-free dispenser is in idle mode or used infrequently), the battery on the refill unit (also referred to as energy on refill (EOR)) will be depleted before the refill unit is empty. When this occurs, the dispenser must then rely upon its permanent battery to power the dispenser until the refill unit is replaced with a new refill unit containing a fresh battery. If the dispenser suffers from long term infrequent use, the permanent battery can be depleted before the dispenser reaches its end of life.

In addition, there are situations in high use, or repeated rapid actuation, environments where the energy from the battery on the refill unit may not be able to provide sufficient energy to power the dispenser. In these high use scenarios, the energy from the permanent battery may need to be drawn upon to supply the additional energy. If the high usage scenario is the predominate usage of the dispenser, the need to draw energy from the permanent battery leads to depletion of the permanent battery prior to the dispenser's end of life. Accordingly, there is a need for an improved power management system that increases both the life of the permanent battery and the life of the battery on the refill bottle while in idle, low and high use environments.

SUMMARY

Dispensers and dispensers having refill units with energy on the refill unit energy sources are disclosed herein. An exemplary dispenser includes a housing, a motor for operating a pump, an object sensor, an auxiliary power source, a receptacle for receiving a refill unit and an energy on the refill receiving receptacle. The dispenser further includes a processor, memory, one or more capacitors, an energy on refill voltage boost circuit, a high power voltage buck circuit and a low power regulator circuit. The low power regulator circuit provides power for at least the processor and the object sensor. The capacitors provide power to the high power voltage buck circuit and the low voltage regulator, and the high voltage buck circuit provides power to operate the motor. A refill unit have an energy on the refill energy source may be inserted into the dispenser.

Another exemplary dispenser includes a housing, a receptacle for receiving a refill unit, an energy on the refill receiving receptacle, an auxiliary power supply, a motor for operating a pump, an object sensor, a processor, memory, one or more capacitors, an energy on the refill boost circuit, a high power voltage buck circuit, and a low power regulator circuit. The low power regulator circuit provides power for the processor and the object sensor. The one or more capacitors provide power for the high power voltage buck circuit and the low voltage regulator circuit. One of the energy on the refill boost circuit and the auxiliary power supply also provide power to the high voltage buck circuit. In addition, the high power voltage buck circuit is energized to provide power to the motor drawing current from the one or more capacitors and from one of the energy on the refill boost circuit and the auxiliary power supply and the high voltage buck circuit is de-energized upon dispensing of the dose of fluid.

Another exemplary dispenser includes a housing, a pump, a motor for operating the pump, an object sensor, an auxiliary power supply, a receptacle for receiving a refill unit, and an energy on the refill receiving receptacle. The dispenser further includes a processor, memory, one or more capacitors, a charge switch circuit, an energy on refill voltage boost circuit, a high power voltage buck circuit, and a low power voltage regulator circuit. The low power voltage regulator circuit provides power for at least the processor and the object sensor. The capacitors provide power for the high power voltage buck circuit and the low voltage regulator circuit. The high voltage buck circuit provides power to operate the motor. The dispenser further comprises logic for causing the processor to turn on the high power voltage buck circuit to drive the motor when the object sensor detects an object in a dispensing zone and logic to turn off the high power voltage buck circuit when a dose of fluid has been dispensed.

An exemplary methodology of providing power for a dispenser for dispensing soap or sanitizer includes providing a dispenser having a housing, a receptacle for receiving a refill unit that includes an energy on refill. The dispenser further includes an energy on the refill voltage boost circuit, an energy on the refill receptacle for placing the energy on refill in circuit communication with the energy on the refill boost circuit, an auxiliary power source, one or more capacitors, a low power voltage regulator circuit, a high power voltage buck circuit, a processor, memory, and an object sensor. The exemplary methodology includes determining a voltage of the energy on refill, turning on the energy on the refill voltage boost circuit if the voltage of the energy on refill is over a threshold voltage to charge the one or more capacitors, and turning off the energy on the refill voltage boost circuit when the one or more capacitors are charged to a selected charge. The methodology includes tuning power on from the auxiliary power source to charge the one or more capacitors if the voltage on the refill is below the threshold voltage; and turning off the power from the auxiliary power source when the one or more capacitors are charge to the selected voltage, providing power to the low power voltage buck circuit from the one or more capacitors, and intermittently providing power to the high power voltage buck circuit from the one or more capacitors and one of the energy on the refill boost circuit and the auxiliary power source.

Another exemplary dispenser includes a housing, a motor for operating a pump, an object sensor, an auxiliary battery, a receptacle for receiving a refill unit, a refill battery receiving receptacle. A refill unit having a refill battery secured thereto may be included in the dispenser. The dispenser further includes a processor, memory, one or more capacitors, and a refill battery voltage boost circuit. The refill battery boost circuitry limits the current draw from the refill battery. The dispenser further includes a high power voltage buck circuit, and a low power regulator circuit. The low power regulator circuit provides power for at least the processor and the object sensor. The one or more capacitors and one or more of the refill battery voltage boost circuit and the auxiliary battery simultaneously provide power to the high power voltage buck circuit, and the high voltage buck circuit provides power to operate the motor.

Another exemplary dispenser includes a housing, a motor for operating a pump, an object sensor, an auxiliary battery, a receptacle for receiving a refill unit, a refill battery receiving receptacle, a processor, memory, one or more capacitors, and a refill battery voltage boost circuit. The refill battery boost circuitry limits the current draw from the refill battery. The dispenser further includes a high power voltage buck circuit, and a low power regulator circuit. The low power regulator circuit provides power for at least the processor and the object sensor. The one or more capacitors and one or more of the refill battery voltage boost circuit and the auxiliary battery simultaneously provide power to the high power voltage buck circuit, and the high voltage buck circuit provides power to operate the motor. The dispenser further includes logic stored in the memory for determining when a refill unit is not installed in the dispenser. When a refill unit is not installed in a dispenser, the processor provides charging the one or more capacitors to a level that is lower than the charge level that the one or more capacitors are charged to when the refill unit having a refill battery is installed in the dispenser.

BRIEF DESCRIPTION OF THE DRAWINGS

These and other features and advantages of the present invention will become better understood with regard to the following description and accompanying drawings in which.

DETAILED DESCRIPTION

The following includes definitions of exemplary terms used throughout the disclosure. Both singular and plural forms of all terms fall within each meaning. Except where noted otherwise, capitalized and non-capitalized forms of all terms fall within each meaning:

"Circuit communication" as used herein indicates a communicative relationship between devices. Direct electrical, electromagnetic and optical connections and indirect electrical, electromagnetic and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers or satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both capable of interfacing with a third device, such as, for example, a CPU, are in circuit communication.

Also, as used herein, voltages and values representing digitized voltages are considered to be equivalent for the purposes of this application, and thus the term "voltage" as used herein refers to either a signal, or a value in a processor representing a signal, or a value in a processor determined from a value representing a signal.

"Signal", as used herein includes, but is not limited to one or more electrical signals, analog or digital signals, one or more computer instructions, a bit or bit stream, or the like.

"Logic," synonymous with "circuit" as used herein includes, but is not limited to hardware, firmware, software and/or combinations of each to perform a function(s) or an action(s). For example, based on a desired application or needs, logic may include a software controlled microprocessor or microcontroller, discrete logic, such as an application specific integrated circuit (ASIC) or other programmed logic device. Logic may also be fully embodied as software. The circuits identified and described herein may have many different configurations to perform the desired functions.

The inventive concepts disclosed and claimed herein are not limited to the particular values or ranges of values used to describe the embodiments disclosed herein.

Figure 1:
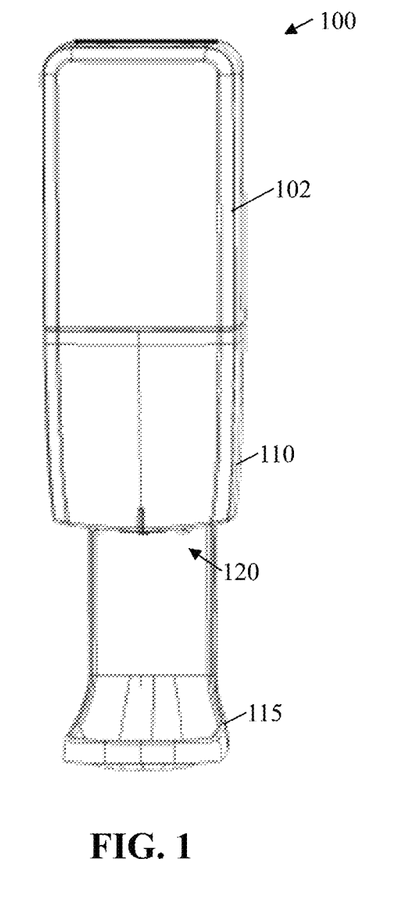
FIG. 1 is a generic illustrative schematic of an exemplary dispenser having a power system that receives dispensing power from a power source inserted and removed with a refill unit.
Figure 2:
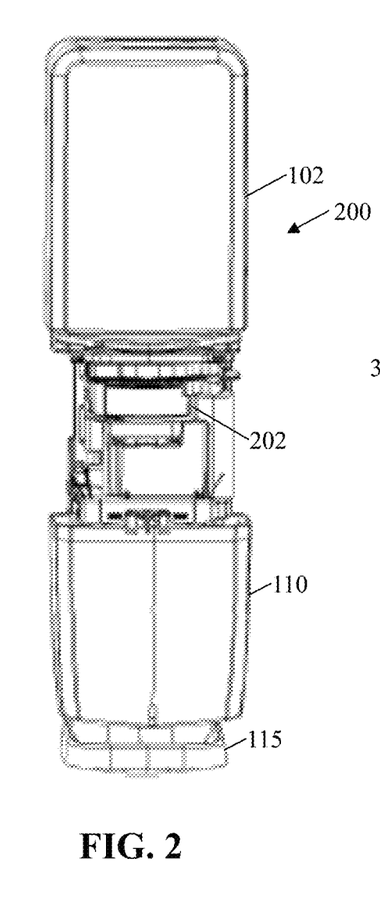
FIG. 2 is the exemplary disponer of FIG. 1 with its cover in the downward position.
Figure 3:
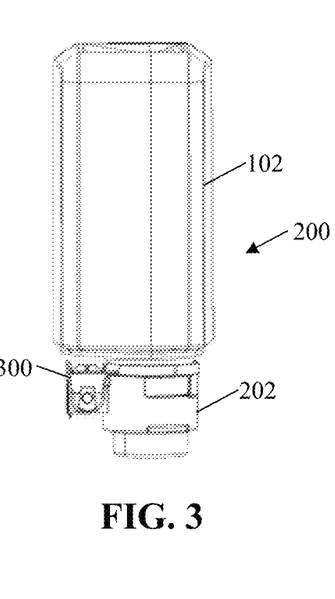
FIG. 3 is an exemplary refill unit having a power source for use in the exemplary dispenser of FIG. 1.

FIG. 1 is an exemplary embodiment of a dispenser 100. In this exemplary embodiment, dispenser 100 is a dispenser for dispensing soap, sanitizer or lotion. Dispenser 100 includes a container (or bottle) 102 of soap, sanitizer or lotion. The dispenser includes a slidable cover 110, a dispensing area 120 and a drip tray 115 for catching any residual drips. FIG. 2 illustrates slidable cover 110 in its downward position allowing the full refill unit 200 to be viewed and removed from the dispenser 100. FIG. 3 illustrates the exemplary refill unit 200 removed from dispenser 100. Refill unit 200 includes container (or bottle) 102, collar 202 and energy source 300, which may be referred to herein as "energy on the refill" or "EOR". When the refill unit 200 is placed in the dispenser 100, the dispenser 100 may draw power from the energy on the refill 300. The energy on the refill 300 may be, for example, a battery. In some embodiments, the EOR is an "AA" battery.

Figures 4, 5:
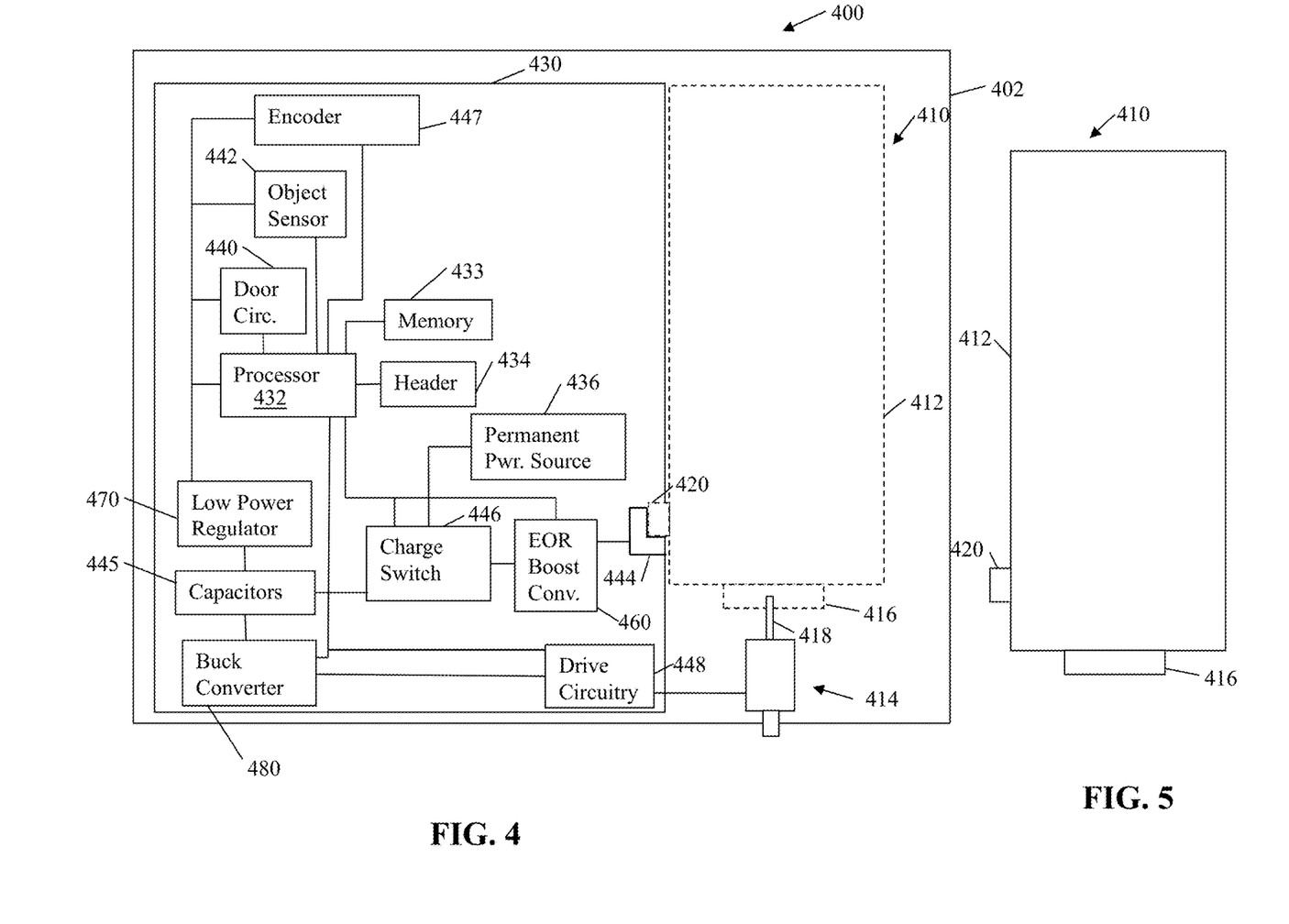
FIG. 4 is a circuit diagram of an exemplary power system in a dispenser.
FIG. 5 is an exemplary refill unit for the exemplary dispenser of claim 4.

FIG. 4 illustrates an exemplary dispenser 400 having an exemplary inventive power management system. Dispenser 400 includes a housing 402. Located within housing 402 is a system circuitry 430. System circuitry 430 may be on a single circuit board or may be on multiple circuit boards. In addition, some of the circuitry may not be on a circuit board, but rather individually mounted and electrically connected to the other components as required.

In this exemplary embodiment, system circuitry 430 includes a processor 432, memory 433, an optional header 434, a permanent power source 436, an optional door switch circuitry 440, an object sensor 442, optional end of stroke circuitry 447, drive circuitry 448, a bank of capacitors 445, a charge switch 446 and energy on the refill interface receptacle 444. System circuitry further includes EOR boost converter 460, a low power regulator 470 and a buck converter 480. In some embodiments, low power regulator 470 may be a low power buck converter.

Processor 432 may be any type of processor, such as, for example, a microprocessor or microcontroller, discrete logic, such as an application specific integrated circuit (ASIC), other programmed logic device or the like. Processor 432 is in circuit communication with optional header 434. Header 434 is a circuit connection port that allows a user to easily connect to system circuitry 130 to program the circuitry, run diagnostics on the circuitry and/or retrieve information from the circuitry.

Processor 432 is in circuit communication with memory 433. Memory 433 may be any type of memory, such as, for example flash memory, Random Access Memory (RAM); Read Only Memory (ROM); programmable read-only memory (PROM), electrically programmable read-only memory (EPROM), electrically erasable programmable read-only memory (EEPROM), magnetic disk or tape, optically readable mediums including CD-ROM and DVD-ROM, or the like, or combinations of different types of memory. In some embodiments, the memory 433 is separate from the processor 432, and in some embodiments, the memory 433 resides on or within processor 432.

Processor 432 is in circuit communication with the EOR boost converter 460, the low power regulator 470 and buck converter 480.

A permanent power source 436, such as, for example, one or more batteries, is also provided. The permanent power source 436 is preferably selected so that the permanent power source 436 does not need to be replaced for the life of the dispenser 400. The permanent power source 436 is in circuit communication with the charge switch circuitry 446. In some embodiments, the permanent power source is four single primary cells in series with an operational terminal voltage between about 3.6 volts and about 6.4 volts.

In this exemplary embodiment, refill unit 410 is shown in phantom lines inserted in the dispenser 400 in FIG. 4 and is also illustrated in solid lines in FIG. 5. Thus, this illustrates that refill unit 410 is inserted into dispenser 400 and removed from dispenser 400 as a unit. Refill unit 410 includes a container 412 and a closure 416. Closure 416 includes a connector that releasably connects to liquid inlet conduit 418 of pump 414.

In this exemplary embodiment, pump 414 is a permanent pump and remains in the dispenser when the refill unit 410 is removed from the dispenser 400. Preferably pump 414 is a sequentially activated multi-diaphragm foam pump. In some embodiments, pump 414 is part of the refill unit 410 and is removed from the dispenser 400 with the refill unit 410. In such embodiments, pump 414 may be a piston pump. In some embodiments, pump 414 is a liquid pump and in some embodiments, pump 414 is a foam pump.

In addition, refill unit 410 includes an Energy On the Refill (EOR) 420. EOR 420 may be any power source, such as, for example, a primary single cell "AA" battery but it could also be a rechargeable battery. The EOR 420 may not present a high enough terminal voltage to directly power the drive circuitry 448, which may include a motor and associated gearing used to cause pump 414 to dispense the contents of the refill unit 410. The EOR 420 is inserted into dispenser 400 with refill unit 410 and is removed from dispenser 400 with refill unit 410. Preferably refill unit 410 has the EOR 420 securely affixed thereto; however, in some embodiments, the EOR 420 is provided separately, but along with the refill unit 410. In either case, however, the EOR 420 is provided with and removed with the refill unit 110. Preferably, the operational terminal voltage of the EOR 420, which maybe a single cell primary battery, is between about 0.6 volts and about 1.6 volts. In some embodiments, the required operational voltage for the pump motor 414 is a higher voltage than the EOR 420, such as, for example, at about 3.0 volts or more.

The EOR 420 is received by, and/or otherwise electrically couple to, interface receptacle 444 and placed in circuit communication with EOR boost converter 460. Processor 432 is also in circuit communication with the EOR boost converter 460. Processor 432 turns the EOR boost converter 460 on and off. Processor 432 measures and/or monitors the EOR boost converter 460 output voltage, and/or the loaded voltage of EOR 420. If the processor 432 determines that EOR 420 has a sufficient charge that is above a selected known good value, the processor 432 can turn on the EOR boost converter 460 to charge the capacitors 445 to an operational voltage that is high enough to operate the drive circuitry 448 that drives the pump 414. The processor 432 monitors the capacitor 445 voltage. If the capacitor 445 voltage is higher than the voltage that is required by the pump motor 414, the processor turns on the buck converter 480 to regulate the capacitors 445 terminal voltage down to the voltage required by the drive circuitry 448 that drives pump 414. In this exemplary embodiment, when the dispenser 400 receives a signal from object sensor 442 to dispense fluid, the processor 432 turns on both the boost converter 480 and the buck converter 460 to provide power to the drive circuitry 448 that drives pump 414.

In some embodiments, processor 432 monitors the terminal voltage of the EOR 420. As the EOR 420 ages, its internal resistance increases. Accordingly, the no-load voltage of the EOR 420 may not be truly indicative of its available capacity. Preferably, the processor 432 monitors the loaded terminal voltage of EOR 420 over a series of dispenses and uses the average loaded voltage to determine whether EOR 420 has enough capacity to be used to charge capacitors 445. As described below, if the loaded voltage of the EOR falls below a selected value or threshold, the EOR 420 is not used to charge capacitors 445. In some embodiments, the threshold may be 1 volt. In some embodiments, the threshold may be 0.9 volts. In some embodiments, the threshold may be 0.85 volts. In some embodiments, the threshold may be 0.8 volts. In some embodiments, the threshold may be 0.75 volts. In some embodiments, the threshold may be 0.7 volts. In some embodiments, the threshold may be 0.65 volts. In some embodiments, the threshold may be 0.6 volts. In some embodiments, the threshold may be less than 0.6 volts.

EOR boost converter 460 boosts the terminal voltage of the EOR 420 up to a selected voltage, (such as, for example, about 4.5 volts) that is coupled to capacitors 445 via the charge switch circuitry 446. In some embodiments, the EOR boost converter 460 acts as a constant current source, and thus, limits its current flowing into the capacitors 445. Limiting the amount of current flowing out of the EOR boost converter 460 also limits its input current draw from EOR 420. Limiting the current is very desirable to increase the life of the EOR 420 and to therefore prevent any overheating of the EOR 420.

If the loaded terminal voltage of EOR 420 is above the selected threshold value, and if the capacitors 445 need to be charged, the processor 432 causes the EOR boost converter 460 to turn on, and via the charge switch circuitry 446, direct power to charge the capacitors 445. If a dose of fluid is to be dispensed, the processor 432 performs the previously described functions and also turns on the buck converter 480 to provide regulated voltage to the drive circuitry 448 to operate pump 414. When a dose of fluid has been dispensed, the processor 432 causes the buck converter 480 to turn off. When the capacitors 445 are fully charged, the processor 432 then turns off the EOR boost converter 460.

The permanent power source 436 is in circuit communication with the capacitors 445 via the charge switch circuitry 446. If processor 432 determines that the loaded terminal voltage of the EOR 420 is below the required threshold voltage to charge the capacitors 445, then the processor 432 causes the charge switch circuitry 446 to connect the permanent power source 436 to the charge capacitors 445. When a dispense of liquid is required, the processor 432 connects, via the charge switch 446, the permanent power source 436 to the capacitors 445 to provide power to the pump motor 414 via the drive circuitry 448 and the buck converter 480.

If EOR 420 is not present then the processor 432 recognizes it is in idle mode and it uses the permanent power source 436 to keep the capacitors 445 charged to a minimal extent to just keep the dispenser on. In this scenario, the life of the permanent power source 436 is greatly extended by the action of the processor allowing the voltage level on the capacitors 445 to drop far below the threshold needed to run the pump 414. For example, by reducing the capacitor's 445 terminal to one half its normal voltage, the life of the permanent power source 436 effectively doubles.

The low power regulator 470 provides power to the low power devices that are required to keep the dispenser 400 in operation, such as, for example, processor 432, object sensor 442, and header 434. The low power regulator 470 is typically always on and is not turned on and off by the processor 432. The low power regulator 470 may also provide power to optional door circuitry 440 and optional encoder 447 as required. The low power regulator 470 coupled to the processor 432 has a low power output and a very low energy loss during use to avoid adversely affecting the battery life of the EOR 420 and/or permanent power source 436. In some embodiments, the low power regulator is a low power buck converter.

The output voltage of the low power regulator 470 is at about 3.3 volts for normal operation but can drop to as low at 2.0 volts when the processor determines that the dispenser is in idle mode. The low power regulator 470 provides less power out when it is operated than the buck converter 480. The low power regulator 470 requires less power input when it is operated than the buck converter 480. In this exemplary embodiment, and as previously mentioned, the EOR boost converter 460 is turned on when needed and off when it is not needed.

Operating the pump 414/drive circuitry 448 is the major consumer of battery power—this difference of the pump 414 running verses the pump 414 not running is typically about than 14,000 to 1. The power system of the dispenser 400 is managed by the processor 432 to limit the peak current dissipation of the two power sources 420, 436. In this exemplary embodiment, the processor 432 uses the stored power in the capacitors 445 simultaneously with either the power from the EOR 420 or the power from the permanent power source 436 to power the drive circuitry 448 and pump 414. The processor 432 effectively flattens the peak to average current of the selected power (e.g. battery) source being used and this results in greatly extended battery life. In addition, powering the drive circuitry 448 and pump 414 via power combined simultaneously from one of the two battery power sources 420 or 436 together with the capacitors 445 allows the dispenser 400 to operate in high use situations where the dispenser 400 rapidly dispensing fluid. In some embodiments, the processor 432 manages the time between dispenses in high use environments to ensure that the capacitors 445 are completely recharged before the next dispense is permitted. In some embodiments, the processor 432 prevents the time between dispenses from being less than one dispense every two seconds.

Processor 432 is in circuit communication with optional door circuitry 440 so that processor 432 knows when the dispenser 400 door (not shown) is closed. In some embodiments, processor 432 will not allow the dispenser 400 to dispense a dose of fluid if the door is open. Door circuitry 440 may be any type of circuitry, such as, for example, a mechanical switch, a magnetic switch, a proximity switch or the like.

Processor 432 is also in circuit communication with an object sensor 442 for detecting whether an object is present in the dispense area. Object sensor 442 may be any type of passive or active object sensor, such as, for example, an infrared sensor and detector, a proximity sensor, an imaging sensor, a thermal sensor or the like. Processor 432 uses object sensor 442 to determine when a dose of fluid is being requested, by, for example, detecting the presence of a person's hand(s) in the dispensing zone.

Processor 432 may be in circuit communication with drive circuitry 448. Drive circuitry 448 may comprise any type of circuitry and may simply be a motor in circuit communication with buck converter 480. Drive circuitry 448 in combination with the processor 432 causes the pump 414 to pump fluid.

In addition, optional encoder 447 is in circuit communication with processor 432 and provides processor 432 with information relating to the position and or speed of the motor (not shown) or pump 414. In some embodiments, optional encoder 447 may be replaced with another position indicator, such as, for example, end of stroke circuitry for the pump 414 so that the processor 432 can determine when to stop the motor. Accordingly, encoder 447 may be any device that provides feedback to processor 432 indicative of when the motor should be stopped at the end of the dispenser, such devices include end of stroke circuitry, an encoder, a physical switch, a magnetic switch, software algorithm or the like that provides positioning and/or speed and/or rotational information to the processor 432 about position of a pump piston, rotational speed of a pump and/or motor, or the like.

In some embodiments, during operation, when a refill unit 410 is inserted into the dispenser 400, the energy on the refill 420 is placed in circuit communications with the EOR boost converter 460 via energy on the refill receptacle 444. Processor 432 is in circuit communications with the capacitors 445 and processor 432 reads the voltage of the energy on the refill 420. If the voltage of energy on the refill 420 is above a certain threshold, the processor 432 directs the charge switch circuitry 446 to use the boost converter 460 via power from the EOR 420 to charge the capacitors 445. Once the capacitors 445 are charged to a selected threshold, such as, for example, between about 3.6 volts and about 6 volts, the processor 432 directs the charge switch circuitry 446 to stop charging capacitors 445 and turns off the Boost Converter 460.

In some embodiments, prior to a refill unit 410 being inserted into the dispenser 400, the permanent power source 436 may be used to charge capacitors 445. The capacitors 445 provide power to low power regulator 470.

Low Power Regulator 470 (which is preferably always on) provides regulated power to the required low power electrical components as needed. In some embodiments, processor 432, header 434, optional door circuitry 440, optional encoder 447, and object sensor 442 receive power from the Low Power Regulator 470.

Provided the dispenser door (not shown) is closed as determined by optional door circuitry 440 (if used), the object sensor 442 monitors the dispense zone (not shown) of dispenser 400. Upon detection of an object in the dispense zone (not shown), processor 432 causes either the EOR 420 via the EOR boost converter 460 or the permanent power source 436, simultaneously with capacitors 445 to provide power to the buck converter 480 to provide power to the drive circuitry 448 and on to the pump 414 to dispense a dose of fluid.

Drive circuitry 448 may be powered for a set amount of time, or optionally, if equipped with an encoder 447, the drive circuitry 448 may be operated until a number of revolutions of the motor (not shown) and/or pump are detected, till the pump 414 reaches a home position, or the like. Once a dose of fluid is dispensed, processor 432 immediately shuts down the buck converter 480 and thereby the drive circuitry 448.

The processor 432 determines whether capacitors 445 are below a selected voltage threshold. If the capacitors are below the threshold and the processor 432 determines the voltage of energy on the refill 420 is above a selected threshold, the processor 432 uses the EOR boost converter 460 via the charge switch circuitry 446 to charge the capacitors 445. If the voltage of the energy on the refill unit 420 is below the selected threshold, then the processor 432 causes the charge switch circuitry 446 to use the permanent power source 436 to charge the capacitors 445. The object sensor 442 continues to monitor the dispensing zone (not shown) for an object and the process repeats itself as described above.

Figure 6:
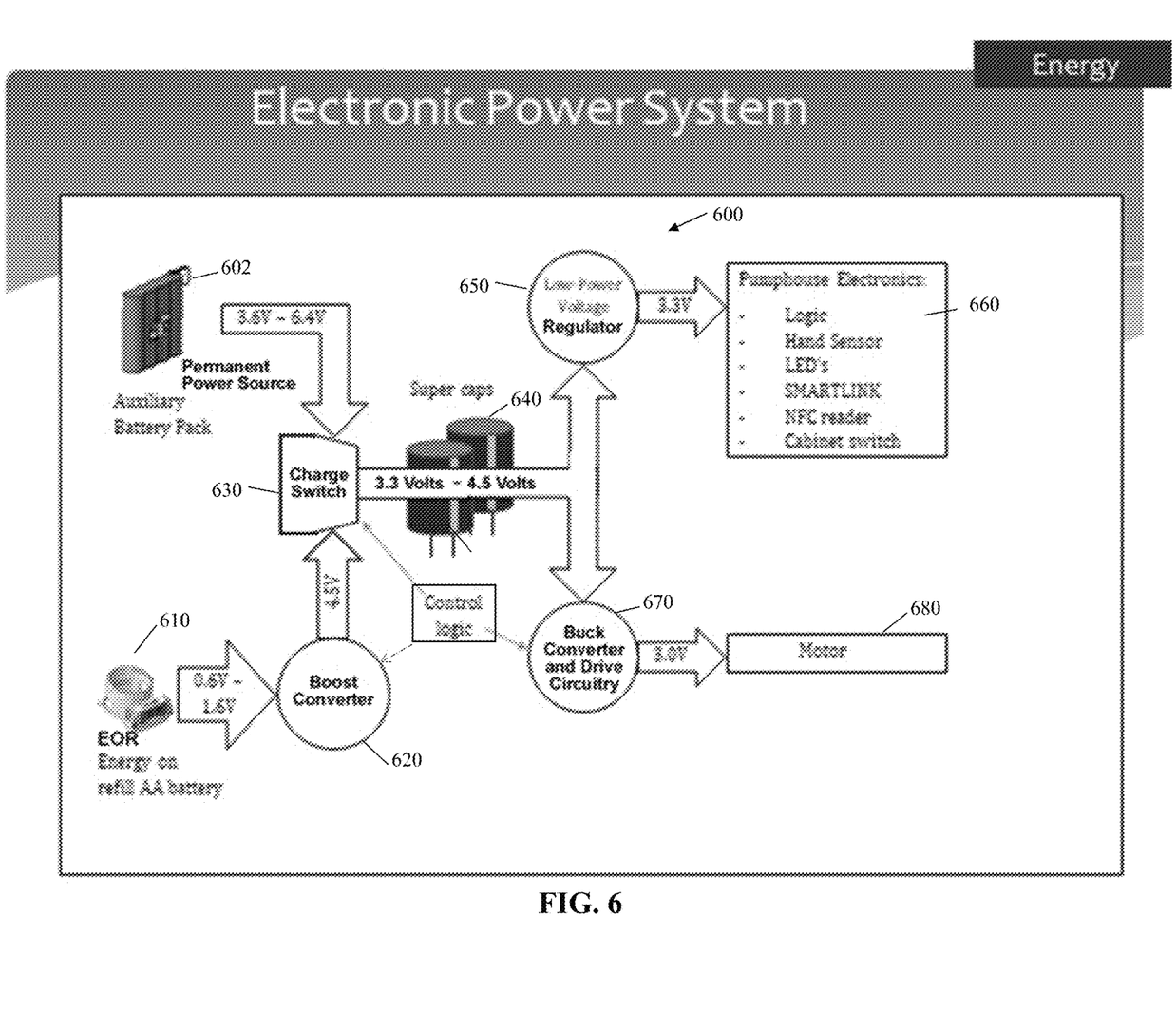
FIG. 6 is a simplified flow diagram of an exemplary power system for a dispenser.

FIG. 6 is a simplified flow diagram of an exemplary embodiment of an innovative power system 600 for a dispenser. Power system 600 includes an auxiliary battery pack 602 (that is permanently mounted in the dispenser), energy on refill 610 (which is inserted into the dispenser when a new refill unit is installed in the dispenser), a boost converter 620, a charge switch 630, super capacitors 640, low power voltage regulator 650, pumphouse electronics 660, buck converter and motor drive circuitry 670, motor 680 and processor not shown. The Processor (not shown) is in circuit communication with boost converter 620, and the buck converter 670. The processor controls whether boost converter 620 is energized, whether buck converter 670 is energized, whether capacitors 640 are charged from the auxiliary battery pack 602 or the energy on refill 610, and whether the buck converter 670 receives power from the capacitors 640 and the EOR 610, or from the capacitors 640 and the auxiliary battery pack 602.

The processor measures the voltage on the super caps 640. If super caps 640 are below a selected threshold, the processor measures the voltage on the energy on refill 610. If the processor determines that the energy on refill 610 has a power capacity that is over a selected threshold, i.e. it has sufficient power to charge the super capacitors 640, then the processor turns on the boost converter 620 and, via the charge switch 630, charges the super caps 640. Once the super caps 640 are fully charged boost converter 620 is turned off.

If an object is detected in the dispense zone (not shown), the processor turns on boost converter 620 and turns on buck converter 670 (provided the EOR 610 is above a selected threshold) to operate motor 680 to dispense a dose of fluid, drawing power from both the capacitors 640 and the EOR 610. Once the dose of fluid has been dispensed, the processor turns off the buck converter 670. Provided the EOR 610 still has sufficient power, i.e. the power is above a selected threshold, the super caps 640 are charged back up to their selected threshold through boost converter 620 and the processor turns off the boost converter 620.

If Processor determines that the voltage of the energy on refill 610 does not meet the selected threshold, then the processor causes the charge switch 630 to direct power from the auxiliary battery pack 602 to charge the super capacitors 640. Once the capacitors are fully charged, the processor causes the charge switch 630 to switch the auxiliary battery pack out of the circuit.

If an object is detected in the dispense zone (not shown), and the processor determines that the EOR 610 is below the selected threshold required to operate motor 680 to dispense a dose of fluid, the processor causes charge switch 630 to place the auxiliary battery pack 602 back in the circuit, turns on buck converter 670 and, drawing power from both the capacitors 640 and the auxiliary battery pack 502 causes the motor 680 to operate to dispense a dose of fluid. Once the dose of fluid has been dispensed, the processor turns off the buck converter 670. The processor checks to determine if the EOR 610 has sufficient power, i.e. the power is above a selected threshold, to charge the super caps 640. If it does the super caps 640 are charged back up to their selected threshold through boost converter 620 and the processor turns off the boost converter 620. If it does not, the supper caps 640 are charged back up to their selected threshold by the auxiliary battery pack 602 via charge switch 630 and then charge switch 630 takes the auxiliary battery pack 602 out of the circuit.

The Low Power Voltage Regulator 650 is powered by super capacitors 640 and provides power to the pump house electronics 660. The pump house electronics, may include, for example, Processor, a hand sensor, one or more LEDs, near field communications reader and/or other wireless communication device, a door switch, IR communication circuitry, logic, etc. The Processor always receives power from the Low Power Voltage Regulator 650 provided that there is enough capacity from one of the two battery sources to power it.

Figure 7:
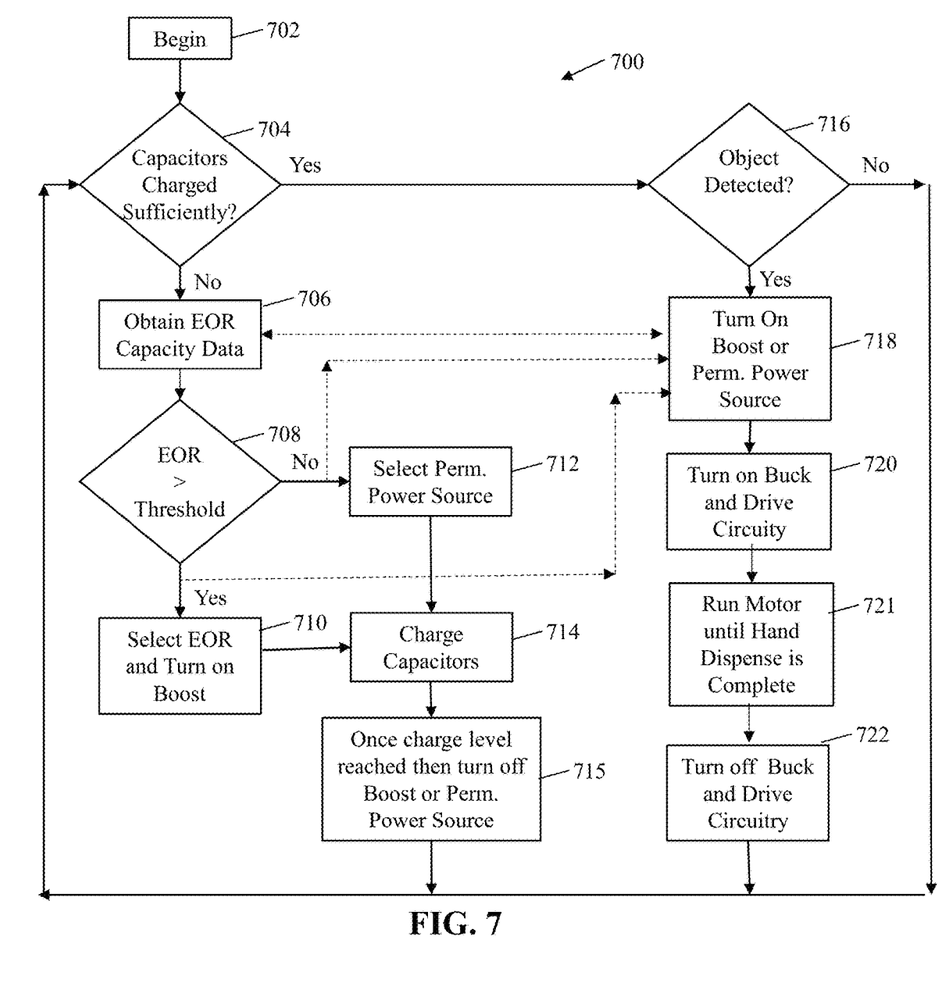
FIG. 7 is an exemplary logic diagram or methodology for controlling an exemplary power system for a dispenser.

FIG. 7 is an exemplary logic diagram or methodology for controlling a power system 700 for a dispenser. Additional blocks or steps may be added to the exemplary methodology. In addition, blocks or steps may be removed from the exemplary methodology. Further, the order of the blocks may be changed and are not required to be performed in the order shown and described.

The exemplary methodology begins at block 702. At block 704 a determination is made as to whether the capacitors are charged to a selected charge level. If the capacitors are sufficiently charged, the exemplary methodology flows to block 716 to determine if an object is detected. If at block 704 a determination is made that the capacitors are not charged to the selected level, the methodology flows to block 706. At block 706, a sufficiency of the EOR on the refill is obtained. The data may be, for example, the no-load voltage of the energy on refill, the loaded voltage for one or more previous dispenses, an average of a set number of loaded voltages, or the like.

At block 708 a determination is made as to whether the data obtained at block 706 indicates that the energy on the refill is above a selected threshold. If it is determined that the data is not indicative of the energy on the refill being above a selected threshold, the logic flows to block 712 and the permanent power source is used to charge the capacitors at block 714. If the data is indicative of the energy on refill being above its selected threshold, the logic flows to block 710 and the boost converter is energized and at block 714 the capacitors are charged using the energy on refill through the boost converter. At block 715, the charging of the capacitors ends.

At the end of charging, the boost converter is turned off. If the permanent power source was used instead to charge the capacitors, its connection to the capacitors is turned off. The exemplary methodology then flows back to block 704.

In some embodiments, charging of capacitors via the boost converter and powering the buck converter occur at the same time, or in an overlapping time period. Typically, the boost converter continues to charge the capacitors after the dose of fluid has been dispensed until the capacitors are fully recharged back to their selected level.

If at block 716 a determination is made that an object is detected, the logic flows to block 718. At block 18, the methodology obtains data on the capacity of the EOR at block 706 and a determination is made as to whether the EOR is above a selected threshold at block 708. The selected threshold may be the same threshold as the threshold used to determine which power source to charge the capacitors or it may be a different threshold. If at block 708 it is determined that the EOR is above the selected threshold, the boost converter is turned on at block 718. If at block 708 it is determined that the EOR is below the selected threshold, the permanent power source is placed in the circuit by the charge switch at block 718. Once a dose of fluid is dispensed at block 721, the buck converter is turned off at block 722 and the methodology flows back to block 704.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. It is not the intention of the applicant to restrict or in any way limit the scope of the appended claims to such detail. Unless expressly excluded herein, all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order in which the steps are presented to be construed as required or necessary unless expressly so stated.

I claim:

1. A dispenser comprising:
    a housing;
    a motor for operating a pump;
    an object sensor;
    an auxiliary power source;
    an area for receiving a refill unit;
    an energy on the refill unit;
    a processor;
    memory;
    one or more capacitors;
    an energy on refill voltage boost circuit;
    a high power voltage buck circuit;
    a low power regulator circuit;
    wherein the low power regulator circuit provides power for at least the processor and the object sensor;
    wherein the one or more capacitors provide power to the high power voltage buck circuit and the low voltage regulator; and
    wherein the high voltage buck circuit provides power to operate the motor.

2. The dispenser of claim 1 wherein one of the auxiliary power source and the energy on the refill unit provide power to the high power voltage buck circuit and wherein the power to operate the motor is drawn from the one or more capacitors and one of the auxiliary power source and the energy on the refill unit.

3. The dispenser of claim 1 wherein the processor effectively flattens a peak to average current of one of the energy on the refill unit source and an auxiliary energy source by drawing power from the one or more capacitors while drawing power from the one of one of the energy on the refill unit and the auxiliary energy source.

4. The dispenser of claim 1 further comprising logic stored in the memory for causing the high power voltage buck circuit to be energized to drive the motor when the object sensor detects an object in a dispensing zone and logic to de-energize the high power voltage buck circuit when a dose of fluid has been dispensed.

5. The dispenser of claim 1 further comprising logic stored in the memory for causing the processor to determine a voltage of the energy on the refill unit.

6. The dispenser of claim 1 further comprising logic stored in the memory for causing the processor to energize the energy on the refill voltage boost circuit to charge the one or more capacitors.

7. The dispenser of claim 1 further comprising logic stored in the memory for causing the processor to energize the energy on refill voltage boost circuit when the high power voltage buck circuit is energized and the energy on the refill unit has sufficient power to charge the one or more capacitors.

8. The dispenser of claim 1 further comprising logic stored in the memory for causing the processor to charge the one or more capacitors from the auxiliary power source if the energy on the refill unit does not have a voltage above a selected threshold.

9. The dispenser of claim 8 wherein the voltage is a loaded voltage.

10. The dispenser of claim 1 wherein the energy on the refill voltage boost circuit limits an output current provided to a charge circuit.

11. The dispenser of claim 1 further comprising a charge switch to switch between charging the one or more capacitors from the energy on refill voltage boost circuit and the auxiliary power source.

12. The dispenser of claim 1 wherein the low power regulator is a low power buck converter.

13. A dispenser comprising:
a housing;
an area for receiving a refill unit;
an energy on the refill unit;
an auxiliary power supply;
a motor for operating a pump;
an object sensor;
a processor;
memory;
one or more capacitors;
an energy on refill voltage boost circuit;
a high power voltage buck circuit;
a low power regulator circuit;
wherein the low power regulator circuit provides power for the processor and the object sensor; and
wherein the one or more capacitors provide power for the high power voltage buck circuit and the low power regulator circuit;
wherein one of the energy on the refill boost circuit and the auxiliary power supply also provide power to the high power voltage buck circuit; and
wherein the high power voltage buck circuit is energized to provide power to the motor drawing current from the one or more capacitors and from one of the energy on the refill boost circuit and the auxiliary power supply and the high voltage buck circuit is de-energized upon dispensing of a dose of fluid.

14. The dispenser of claim 13 further comprising charge circuitry for causing the one or more capacitors to be charged from the energy on the refill unit or from the auxiliary power supply.

15. The dispenser of claim 13 further comprising logic for causing the processor to turn on the energy on the refill voltage boost circuit to charge the one or more capacitors if the energy on the refill unit has a voltage above a selected threshold.

16. A method of providing power for a dispenser for dispensing soap or sanitizer comprising:
providing a dispenser having
a housing;
an area for receiving a refill unit;
the refill unit having an energy on the refill unit;
an energy on refill voltage boost circuit;
the energy on the refill unit for placing the energy on the refill unit in circuit communication with the energy on the refill voltage boost circuit;
an auxiliary power source;
one or more capacitors;
a low power voltage regulator circuit;
a high power voltage buck circuit;
a processor;
memory; and
an object sensor;
determining a voltage of the energy on the refill unit;
turning on the energy on the refill voltage boost circuit if the voltage of the energy on the refill unit is over a threshold voltage to charge the one or more capacitors;
turning off the energy on the refill voltage boost circuit when the one or more capacitors are charged to a selected charge;
tuning power on from the auxiliary power source to charge the one or more capacitors if the voltage of the energy on the refill unit is below the threshold voltage; and turning off the power from the auxiliary power source when the one or more capacitors are charge to the selected charge;
providing power to the low power voltage regulator circuit from the one or more capacitors; and
intermittently providing power to the high power voltage buck circuit from the one or more capacitors and one of the energy on the refill voltage boost circuit and the auxiliary power source.

17. The method of claim 16 wherein the voltage of the energy on the refill unit is a no-load voltage.

18. The method of claim 16 wherein the voltage of the energy on the refill unit is a loaded voltage.

19. The method of claim 16 further comprising turning on the energy on the refill voltage boost circuit when the high power voltage buck circuit is turned on.

* * * * *